(12) United States Patent
Volny et al.

(10) Patent No.: US 11,148,815 B2
(45) Date of Patent: Oct. 19, 2021

(54) PARACHUTES AND METHODS OF MAKING PARACHUTES HAVING EQUALIZED CONFLUENCE INSERTIONS

(71) Applicant: GOODRICH CORPORATION, Charlotte, NC (US)

(72) Inventors: Jaro S. Volny, Scottsdale, AZ (US); Kassidy L. Carson, Colorado Springs, CO (US)

(73) Assignee: Goodrich Corporation, Charlotte, NC (US)

( * ) Notice: Subject to any disclaimer, the term of this patent is extended or adjusted under 35 U.S.C. 154(b) by 335 days.

(21) Appl. No.: 16/245,764

(22) Filed: Jan. 11, 2019

(65) Prior Publication Data
US 2020/0223551 A1    Jul. 16, 2020

(51) Int. Cl.
*B64D 17/34*    (2006.01)
*B64D 17/26*    (2006.01)

(52) U.S. Cl.
CPC ........... *B64D 17/346* (2013.01); *B64D 17/26* (2013.01)

(58) Field of Classification Search
CPC ........ B64D 17/26; B64D 1/24; B64D 17/346; B64D 17/22; B64D 17/50
See application file for complete search history.

(56) References Cited

U.S. PATENT DOCUMENTS

| 4,399,969 A * | 8/1983 | Gargano | B64D 17/025 244/145 |
|---|---|---|---|
| 4,834,323 A * | 5/1989 | Reuter | B64D 17/12 244/145 |
| 5,472,155 A * | 12/1995 | Mastrolia | B64D 17/24 244/145 |
| 2017/0327236 A1 | 11/2017 | Mastrolia et al. | |

* cited by examiner

*Primary Examiner* — Richard R. Green
*Assistant Examiner* — Ashesh Dangol
(74) *Attorney, Agent, or Firm* — Snell & Wilmer L.L.P.

(57) ABSTRACT

A suspension line assembly for a parachute may comprise a first set of suspension lines bound together to form a first riser, and a second set of suspension lines bound together to form a second riser. A confluence may be formed by the first set of suspension line and the second set of suspension line. The confluence may comprise interior confluence suspension lines and exterior confluence suspension lines that alternate circumferentially along a perimeter of a parachute canopy.

19 Claims, 4 Drawing Sheets

PARACHUTES AND METHODS OF MAKING PARACHUTES HAVING EQUALIZED CONFLUENCE INSERTIONS

FIELD

The present disclosure relates to parachutes, and more specifically, to parachutes and methods of making parachutes having equalized confluence insertions.

BACKGROUND

Parachutes may be used to slow and stabilize an object (e.g., ejection seat or a person) supported by the parachute. Parachutes typically comprise a canopy to increase drag, and suspension lines coupled to the canopy. The suspension lines may be weaved or otherwise bound to one another to form risers configured to attach the object to the parachute and stabilize the object to reduce rotation while under canopy.

The suspension lines may form a "confluence" at a given distance from the canopy. At the confluence, the suspension lines may inserted into one another. Conventional confluence designs typically insert all the suspension lines from one riser into the suspension lines of another riser. For example, in a parachute comprising two risers, a first riser may be formed from a first set of suspension lines attached to one half of the canopy, and a second riser may be formed from a second set of suspension lines coupled to the other half of the canopy. At the confluence, the suspension lines forming the first riser may be inserted into the suspension lines forming the second riser. During parachute deployment, as the outer suspension lines experience tension, they may restrict or "choke" the inner (i.e., inserted) suspension lines from stretching, which can cause unequal tension in the outer and inner the suspension lines. Additionally, the inner suspensions lines may restrict or otherwise block the outer lines from constricting at their diametral plane, such that a diameter of the outer lines is greater than a diameter of the inner lines. Inequality in diameter may result in the outer suspension lines having a longitudinal stretch length different from the inner suspension lines. Accordingly, conventional confluence insertion schemes may cause asymmetric loading of the suspension lines, which can result in asymmetric canopy inflation. Asymmetric canopy inflation is undesirable, as it can reduce stability, drag, and symmetry in the load distribution between the risers, which may transfer instability to the object and/or increase a chance of injury or damage to the object.

SUMMARY

A suspension line assembly for a parachute is disclosed herein. In accordance with various embodiments, the suspension line assembly may comprise a first set of suspension lines bound together, and a second set of suspension lines bound to together. The first set of suspension lines may form a first riser. The second set of suspension lines may form a second riser. A first suspension line of the first set of suspension lines may be located within a first suspension line of the second set of suspension lines. A second suspension line of the second set of suspension lines may be located within a second suspension line of the first set of suspension lines.

In various embodiments, a first confluence may be formed by the first set of suspension lines and the second set of suspension lines. The first suspension line of the first set of suspension lines and the second suspension line of the second set of suspension lines may each form an interior confluence suspension line of the first confluence. The first suspension line of the second set of suspension lines and the second suspension line of the first set of suspension lines may each form an exterior confluence suspension line of the first confluence.

In various embodiments, the first set of suspension lines may alternate circumferentially between forming interior confluence suspension lines of the first confluence and forming exterior confluence suspension lines of the first confluence. The second set of suspension lines may alternate circumferentially between forming interior confluence suspension lines of the first confluence and forming exterior confluence suspension lines of the first confluence.

In various embodiments, the first suspension line of the first set of suspension lines may be located circumferentially between the second suspension line of the first set of suspension lines and the first suspension line of the second set of suspension lines.

In various embodiments, the suspension line assembly may further comprise a third set of suspension lines bound together, and a fourth set of suspension lines bound together. The third set of suspension lines may form a third riser, and the fourth set of suspension lines may form a fourth riser. In various embodiments, a second confluence may be formed by the third set of suspension lines and the fourth set of suspension lines.

In various embodiments, the third set of suspension lines may alternate circumferentially between forming interior confluence suspension lines of the second confluence and exterior confluence suspension lines of the second confluence. The fourth set of suspension lines may alternate circumferentially between forming interior confluence suspension lines of the second confluence and forming exterior confluence suspension lines of the second confluence.

In various embodiments, the third set of suspension lines may comprise at least one interior confluence suspension line of the second confluence and at least one exterior confluence suspension line of the second confluence. The fourth set of suspension lines may comprise at least one interior confluence suspension line of the second confluence and at least one exterior confluence suspension line of the second confluence.

A parachute is also disclosed herein. In accordance with various embodiments, the parachute may comprise a canopy and a suspension line assembly coupled to the canopy. The suspension line assembly may comprise a first set of suspension lines bound together and a second set of suspension lines bound together. The first set of suspension lines may form a first riser. The second set of suspension lines may form a second riser. A first suspension line of the first set of suspension lines may be located within a first suspension line of the second set of suspension lines. A second suspension line of the second set of suspension lines may be located within a second suspension line of the first set of suspension lines.

In various embodiments, a first confluence may be formed by the first set of suspension lines and the second set of suspension lines. The first suspension line of the first set of suspension lines and the second suspension line of the second set of suspension lines may each form an interior confluence suspension line of the first confluence. The first suspension line of the second set of suspension lines and the second suspension line of the first set of suspension lines may each form an exterior confluence suspension line of the first confluence.

In various embodiments, the first set of suspension lines may alternate circumferentially about a perimeter of the canopy between forming interior confluence suspension lines of the first confluence and forming exterior confluence suspension lines of the first confluence. The second set of suspension lines may alternate circumferentially about the perimeter of the canopy between forming interior confluence suspension lines of the first confluence and forming exterior confluence suspension lines of the first confluence.

In various embodiments, the first suspension line of the first set of suspension lines may be located circumferentially between the second suspension line of the first set of suspension lines and the first suspension line of the second set of suspension lines.

In various embodiments, a third set of suspension lines may be bound together to form a third riser, and a fourth set of suspension lines may be bound to together to form a fourth riser. In various embodiments, a second confluence may be formed by the third set of suspension lines and the fourth set of suspension lines.

In various embodiments, the third set of suspension lines may alternate circumferentially between forming interior confluence suspension lines of the second confluence and forming exterior confluence suspension lines of the second confluence. The fourth set of suspension lines may alternate circumferentially between forming interior confluence suspension lines of the second confluence and forming exterior confluence suspension lines of the second confluence.

In various embodiments, the third set of suspension lines may comprise at least one interior confluence suspension line of the second confluence and at least one exterior confluence suspension line of the second confluence. The fourth set of suspension lines may comprise at least one interior confluence suspension line of the second confluence and at least one exterior confluence suspension line of the second confluence.

A method of making a parachute is also disclosed herein. In accordance with various embodiments, the method may comprise forming a first riser by binding a first set of suspension lines together, forming a second riser by binder a second set of suspension lines together, and forming a first confluence using the first set of suspension lines and the second set of suspension lines. The first confluence may comprise a plurality of first interior confluence suspension lines and a plurality of first exterior confluence suspension lines. The plurality of first interior confluence suspension lines may comprise at least one suspension line from the first set suspension lines and at least one suspension line from the second set of suspension lines. The plurality of first exterior confluence suspension lines may comprise at least one suspension line from the first set of suspension lines and at least one suspension line from the second set of suspension lines.

In various embodiments, forming the first confluence may comprise inserting a first suspension line into a second suspension line, and inserting a third suspension line into a fourth suspension line. The first set of suspension lines may include the first suspension line and the second set of suspension lines may include the second suspension line. The second suspension line may be circumferentially adjacent to the first suspension line. The first set of suspension lines may include the fourth suspension line and the second set of suspension lines may include the third suspension line. The third suspension line may be circumferentially adjacent to the second suspension line. The first suspension line may be circumferentially between the second suspension line and the fourth suspension line.

In various embodiments, the method may further comprise coupling a canopy to the first set of suspension lines and the second set of suspension lines. The plurality of first interior confluence suspension lines and the plurality of first exterior confluence suspension lines may alternate circumferentially along a perimeter of the canopy.

In various embodiments, the method may further comprise forming a second confluence. The second confluence may comprise a plurality of second interior confluence suspension lines and a plurality of second exterior confluence suspension lines. The plurality of second interior confluence suspension lines and the plurality of exterior confluence suspension lines may alternate circumferentially along the perimeter of the canopy.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1A:
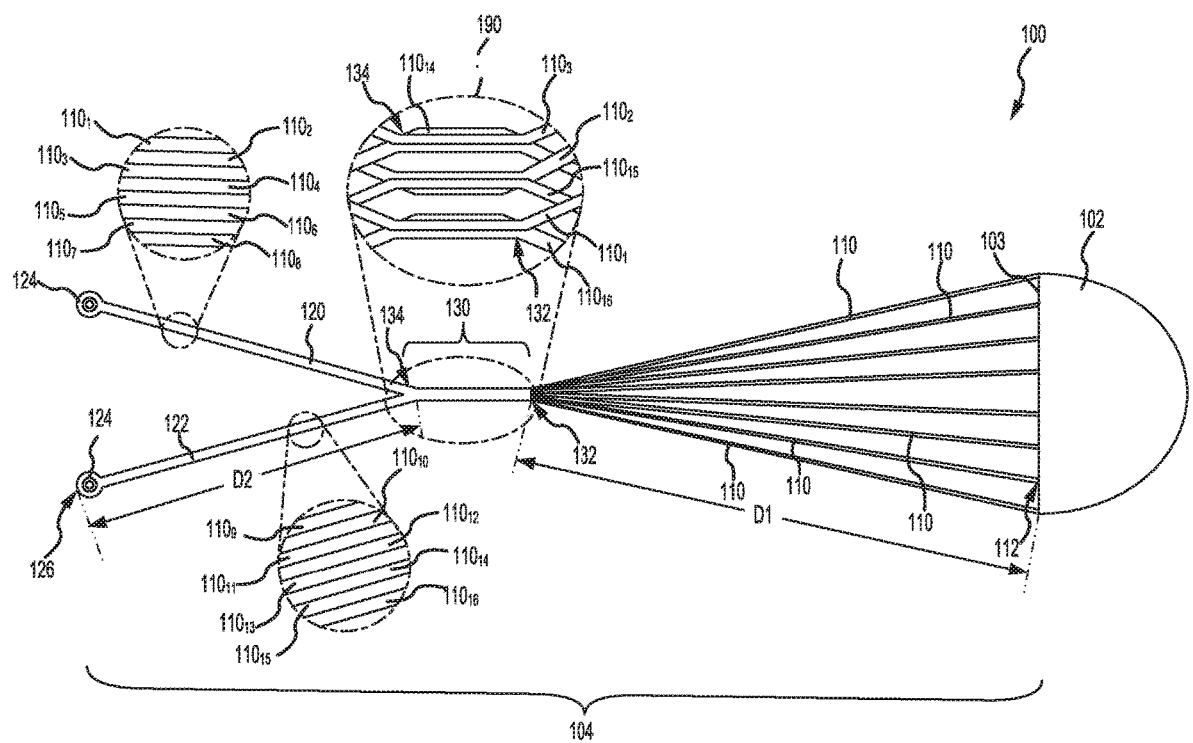
FIG. 1A illustrates a parachute having equalized confluence insertions, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Disclosed herein is a parachute including a suspension line assembly having equalized confluence insertions. As disclosed herein, a suspension line assembly may include a number 1, 2, 3, . . . n, of suspension lines, wherein the suspension lines are numbered circumferentially about a circumference of the parachute canopy. In accordance with various embodiments, the equalized confluence insertions are formed by inserting suspension line 1 into suspension line 'n', inserting suspension line 'n−1' into suspension line 2, inserting suspension line 3 into suspension line 'n−2', inserting suspension line 'n−3' into suspension line 4, etc. For example, in a suspension line assembly having 16 suspension lines, suspension line 1 is inserted into suspension line 16, suspension line 15 is inserted into line 2, suspension line 3 is inserted into suspension line 14, suspension line 13 is inserted into suspension line 4, etc. By rotating which suspension line is inserted about the canopy circumference, any asymmetry in line stretch may be more evenly distributed to risers and the canopy. Thus, during canopy inflation, any variation in tension in the suspension lines alternates along the perimeter (i.e., circumference) of the canopy, as opposed to convention confluences wherein, for example, one half of the canopy experiences a greater tension than the other half With reference to FIGS. 1A and 1B, a parachute 100 having equalized confluence insertions is illustrated, in accordance with various embodiments. Parachute 100 comprises a canopy 102. Upon deployment of parachute 100, canopy 102 may deploy to increase drag, or otherwise decelerate, an object, for example, an ejection seat or a person, supported by parachute 100. Canopy 102 may comprise any suitable type of canopy and any suitable type of material, such as, for example, canvas, silk, nylon, aramid fiber (e.g., KEVLAR®), polyethylene terephthalate, and/or the like.

Parachute 100 also includes a suspension line assembly 104. Suspension line assembly 104 is comprised of suspension lines 110. In various embodiments, suspension lines 110 may be attached to canopy 102 at a first end 112 of suspension line assembly 104. Suspension lines 110 may each comprise a braided material, for example, braided nylon, aramid fiber (e.g., KEVLAR®), and/or the like. Each suspension line 110 may comprise a generally tubular shape that constricts in diameter under tension. As discussed in further detail below, the tubular shape of suspension lines 110 is configured to allow the suspension lines to be inserted into one another.

Figure 1B:
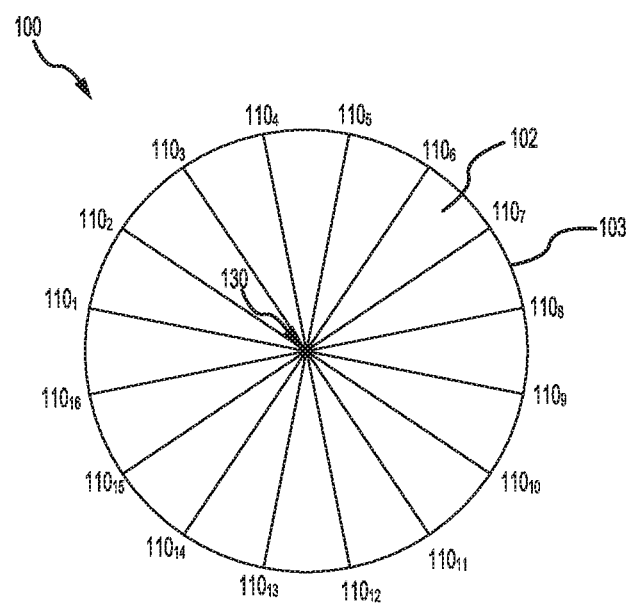
FIG. 1B illustrates suspension lines attached about a canopy circumference, in accordance with various embodiments.

With reference to FIG. 1B, suspension lines 110 are numbered circumferentially based on their attachment along a circumference, or perimeter, 103 of canopy 102. For example, going in a first circumferential direction (e.g., clockwise), suspension line $110_1$ is circumferentially adjacent to suspension line $110_2$, suspension line $110_2$ is circumferentially adjacent to suspension line $110_3$, suspension line $110_3$ is circumferentially adjacent to suspension line $110_4$, etc. With momentary reference to FIG. 2A, the "number 1" suspension line (e.g., suspension line $110_1$ in FIG. 1B) is located circumferentially between the "number 2" suspension line (e.g., suspension line $110_2$ in FIG. 1B) and the final or "number n" suspension line (e.g., suspension line $110_{16}$ in FIG. 1B).

Returning to FIGS. 1A and 1B, suspension line assembly 104 includes a first riser 120 and a second riser 122. First and second risers 120, 122 may be formed by binding, or otherwise coupling, suspension lines 110 together. For example, a first set of suspension lines 110 (e.g., suspension lines $110_1$-$110_8$) may be bound or coupled together to form first riser 120, and a second set of suspension lines 110 (e.g., suspension lines $110_9$-$110_{16}$) may be bound or coupled together to form second riser 122. Suspension lines $110_1$-$110_8$ may be bound together via weaving, stitching, adhesive, and/or through any other suitable attachment method to form first riser 120. Suspension lines $110_9$-$110_{16}$ may be bound together via weaving, stitching, adhesive, and/or through any other suitable attachment method to form second riser 122. While parachute 100 is illustrated as having 16 suspension lines 110 (i.e., suspension lines $110_1$-$110_{16}$) with 8 circumferentially adjacent suspension lines 110 per riser, it is further contemplated and understood that parachute 100 may include any number of suspensions lines 110, such as, for example, 4 to 32 suspension lines 110, and first and second risers 120, 122 may be formed from any number of suspension lines 110, such as, for example, 8 to 16 suspension lines 110 per riser, or 2 to 6 suspension lines 110 per riser. Additionally, parachute 100 may include more than 2 risers.

First and second risers 120, 122 may be configured to attach an object, such as an ejections seat or an occupant harness, to parachute 100. In various embodiments, first and second risers 120, 122 may each comprise an attachment location 124. Attachment locations 124 may be proximate a second end 126 of suspension line assembly 104. Second end 126 is generally opposite first end 112 and canopy 102. Stated differently, suspension lines 110 may be coupled to canopy 102 at first end 112 and to an object at second end 126. Attachment location 124 may comprise any suitable attachment mechanism for securing an object to parachute 100. In various embodiments, attachment location 124 may comprise a loop created by each riser being bound to itself Suspension line assembly 104 includes a confluence 130. Confluence 130 is formed a distance D1 from circumference 103 of canopy 102 and a distance D2 from second end 126 of suspension line assembly 104. At an inlet end 132 of confluence 130, suspension lines 110 may be inserted into one another. At an exit end 134 of confluence 130, the inserted suspension lines (referred to herein as interior confluence suspension lines) may exit the receiving suspension lines (referred to herein as exterior confluence suspension lines). At exit end 134, suspension lines $110_1$-$110_8$ are weaved or otherwise bound together to form first riser 120, and suspension lines $110_9$-$110_{16}$ are weaved or otherwise bound together to form second riser 122. Stated differently, at exit end 134, bound suspension lines $110_1$-$110_8$ of first riser 120 and bound suspension lines $110_9$-$110_{16}$ of second riser 122 are decoupled from one another so that they may be inserted into one another to form confluence 130. Stated yet another way, suspension lines $110_1$-$110_8$ are bound together and suspension lines $110_9$-$110_{16}$ are bound together from second end 126 to exit end 134. In this regard, confluence 130 comprises an area of suspension line assembly 104 wherein suspension lines 110 transition from the bound suspension lines of first and second risers 120, 122 to discrete, independent suspension lines that are individually coupled about the circumference 103 of canopy 102.

Confluence 130 is formed by alternating circumferentially which suspension lines 110 are inserted (i.e., which suspension lines 110 form interior confluence suspension lines) and which suspension lines receive the inserted suspension lines (i.e., which suspension lines 110 form exterior confluence lines). In this regard, each inserted suspension will be circumferentially adjacent, or between, two receiving suspension lines, and each receiving suspension line will be circumferentially adjacent, or between, two inserted suspension lines. For example, in various embodiments, suspension line $110_1$ is inserted into suspension line $110_{16}$ (i.e., suspension line $110_{16}$ receives suspension line $110_1$), suspension line $110_{15}$ is inserted into suspension line $110_2$, suspension line $110_3$ is inserted into suspension line $110_{14}$, suspension line $110_{13}$ is inserted into suspension line $110_4$, suspension line $110_5$ is inserted into suspension line $110_{12}$, suspension line $110_{11}$ is inserted into suspension line $110_6$, suspension line $110_7$ is inserted into suspension line $110_{10}$, and suspension line $110_9$ is inserted into suspension line $110_8$. Thus, suspension lines $110_1$, $110_3$, $110_5$, $110_7$, $110_9$, $110_{11}$, $110_{13}$, $110_{15}$ form interior confluence suspension lines of confluence 130 and suspension lines $110_2$, $110_4$, $110_6$, $110_8$, $110_{10}$, $110_{12}$, $110_{14}$, $110_{16}$ form exterior confluence suspension lines. Circle 190 in FIG. 1A shows details of confluence 130. In particular, circle 190 shows suspension line $110_1$ inserted into suspension line $110_{16}$, suspension line $110_{15}$ inserted into suspension line $110_2$, and suspension line $110_3$ inserted into suspension line $110_{14}$. Suspension lines $110_4$-$110_{13}$ of confluence 130 have been omitted from circle 190 for clarity.

In various embodiments, first riser 120 may be comprised of circumferentially adjacent suspension lines $110_1$-$110_8$, such that first riser 120 includes four interior confluence suspension lines (i.e., suspension lines $110_1$, $110_3$, $110_5$, $110_7$) and four exterior confluence suspension lines (i.e., suspension lines $110_2$, $110_4$, $110_6$, $110_8$). Second riser 122 may be comprised of circumferentially adjacent suspension lines $110_9$-$110_{16}$, such that second riser 122 also includes four interior confluence suspension lines (i.e., suspension lines $110_9$, $110_{11}$, $110_{13}$, $110_{15}$) and four exterior confluence suspension lines (i.e., suspension lines $110_{10}$, $110_{12}$, $110_{14}$, $110_{16}$). Alternating which suspension line is inserted circumferentially tends to distribute any asymmetry in line stretch more evenly to first and second risers 120, 122 and about circumference 103 of canopy 102. Thus, during canopy inflation, any variation in tension between the interior confluence suspension lines and the exterior confluence suspension lines alternates along circumference 103 of canopy 102, as opposed to convention confluences insertions wherein, for example, suspension lines $110_1$-$110_8$ are all interior confluence suspension lines thus the half of the canopy 102 attached to suspension lines $110_1$-$110_8$ experiences a different tension than the half of canopy attached to exterior suspension lines $110_9$-$110_{16}$.

Figure 2A:
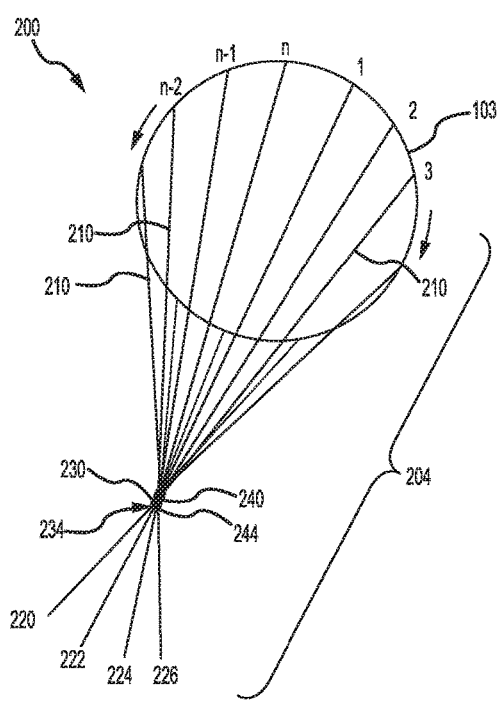
FIG. 2A illustrates a parachute having equalized confluence insertions, in accordance with various embodiments.
Figure 2B:
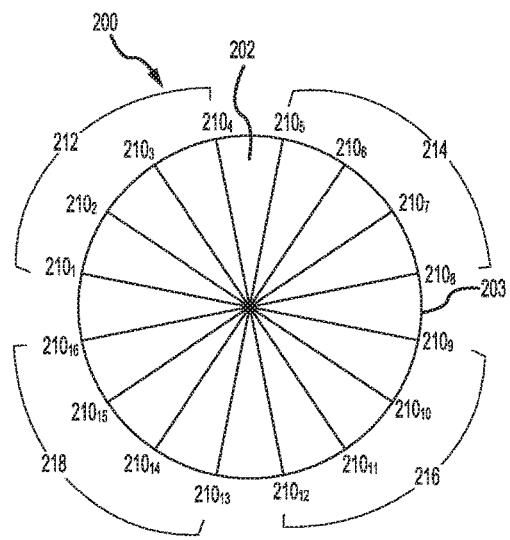
FIG. 2B illustrates suspension lines attached about a canopy circumference, in accordance with various embodiments.

With reference to FIGS. 2A and 2B, a parachute 200 is illustrated. Parachute 200 comprises a canopy 202 and a suspension line assembly 204 coupled to canopy 202. Suspension line assembly 204 includes a plurality of suspension lines 210, similar to suspension lines 110 in FIG. 1A. Suspension line assembly 204 includes a first riser 220, a second riser 222, a third riser 224, and a fourth riser 226. Risers 220, 222, 224, 226 may be formed by binding, or otherwise coupling, suspension lines 210 together. For example, in various embodiments, a first set 212 of suspension lines 210 (e.g., suspension lines $210_1$-$210_4$) may be bound or coupled together to form first riser 220, a second set 214 of suspension lines 210 (e.g., suspension lines $210_5$-$210_8$) may be bound or coupled together to form second riser 222, a third set 216 of suspension lines 210 (e.g., suspension lines $210_9$-$210_{12}$) may be bound or coupled together to form third riser 224, and a fourth set 218 of suspension lines 210 (e.g., suspension lines $210_{13}$-$210_{16}$) may be bound or coupled together to form fourth riser 226.

Suspension line assembly 204 includes a first confluence 230 and a second confluence 240. In various embodiments, first confluence 230 may be formed by first set 212 and second set 214 of suspension lines 210, and second confluence 240 may be formed by third set 216 and fourth set 218 of suspension lines 210.

First confluence 230 is formed by alternating circumferentially which suspension lines 210 of first set 212 and second set 214 are inserted (i.e., which suspension lines 210 form interior confluence suspension lines of first confluence 230) and which suspension lines 210 of first set 212 and second set 214 receive the inserted suspension lines (i.e., which suspension lines 210 form exterior confluence lines of first confluence 230). For example, in various embodiments, suspension line $210_1$ is inserted into suspension line $210_8$, suspension line $210_7$ is inserted into suspension line $210_2$, suspension line $210_3$ is inserted into suspension line $110_6$, and suspension line $110_5$ is inserted into suspension line $110_4$. At an exit end 234 of first confluence 230, suspension lines $210_1$-$110_4$ are weaved or otherwise bound together to form first riser 220, and suspension lines $210_5$-$210_8$ are weaved or otherwise bound together to form second riser 222.

Second confluence 240 is formed by alternating circumferentially which suspension lines 210 of third set 216 and fourth set 218 are inserted (i.e., which suspension lines 210 form interior confluence suspension lines of second confluence 240) and which suspension lines 210 of third set 216 and fourth set 218 receive the inserted suspension lines (i.e., which suspension lines 210 form exterior confluence lines of second confluence 240). For example, in various embodiments, suspension line $210_9$ is insert into suspension line $210_{16}$, suspension line $210_{15}$ is inserted into suspension line $210_{10}$, suspension line $210_{11}$ is inserted into suspension line $210_{14}$, and suspension line $210_{13}$ is inserted into suspension line $210_{12}$. At an exit end 244 of second confluence 240, suspension lines $210_9$-$210_{12}$ are weaved or otherwise bound together to form third riser 224, and suspension lines $210_{13}$-$210_{16}$ are weaved or otherwise bound together to form fourth riser 226.

While parachute 200 is illustrated as having 16 suspension lines 210 (i.e., suspension lines $210_1$-$210_{16}$) with 4 circumferentially adjacent suspension lines 210 per riser, it is further contemplated and understood that parachute 200 may include any number of suspensions lines 210, such as, for example, 8 to 32 suspension lines 110, and risers 220, 222, 224, 226 may be formed from any number of suspension lines 210, such as, for example, 8 to 16 suspension lines 210 per riser, or 2 to 6 suspension lines 210 per riser. Additionally, parachute 200 may include more than 4 risers.

In various embodiments, first riser 220 may be comprised of circumferentially adjacent suspension lines $210_1$-$210_4$, such that first riser 220 includes two interior confluence suspension lines (i.e., suspension lines $210_1$, $210_3$) and two exterior confluence suspension lines (i.e., suspension lines $210_2$, $210_4$). Second riser 222 may be comprised of circumferentially adjacent suspension lines $210_5$-$210_8$, such that second riser 222 also includes two interior confluence suspension lines (i.e., suspension lines $210_5$, $210_7$,) and two exterior confluence suspension lines (i.e., suspension lines $210_6$, $210_8$). Third riser 224 may be comprised of circumferentially adjacent suspension lines $210_9$-$210_{12}$, such that third riser 224 includes two interior confluence suspension lines (i.e., suspension lines $210_9$, $210_{11}$) and two exterior confluence suspension lines (i.e., suspension lines $210_{10}$, $210_{12}$). Fourth riser 226 may be comprised of circumferentially adjacent suspension lines $210_{13}$-$210_{16}$, such that fourth 226 riser includes two interior confluence suspension lines (i.e., suspension lines $210_{13}$, $210_{15}$,) and two exterior confluence suspension lines (i.e., suspension lines $210_{14}$, $210_{16}$).

Circumferentially alternating which suspension lines are inserted tends to distribute any asymmetry in line stretch more evenly to risers 220, 222, 224, 226 and about circumference 203 of canopy 202 (also referred to as a perimeter of canopy 202). Thus, during canopy inflation, any variation in tension between the interior confluence suspension lines and the exterior confluence suspension lines alternates along circumference 203 of canopy 202.

Figure 3:
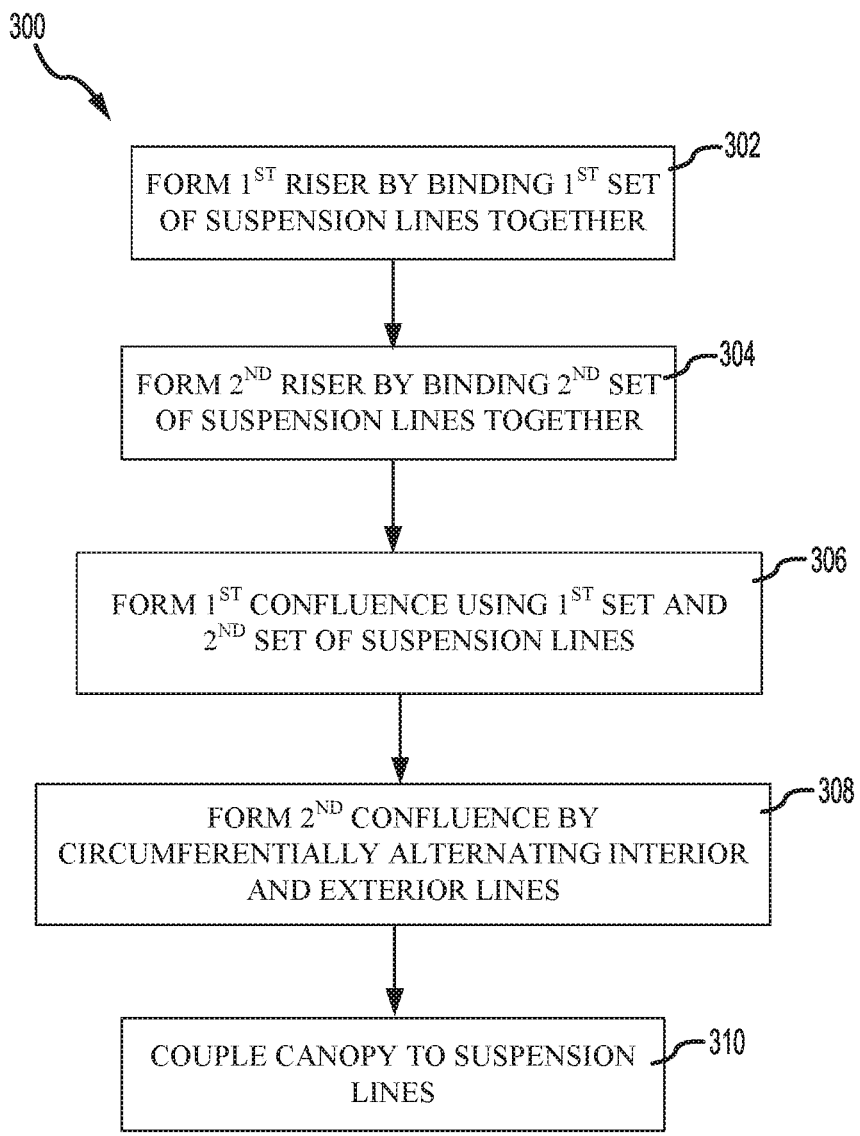
FIG. 3 illustrates a method of making a parachute having equalized confluence insertions, in accordance with various embodiments.

In accordance with various embodiments, and with reference to FIG. 3, a method 300 of making a parachute is disclosed. Method 300 may comprise forming a first riser by binding a first set of suspension lines together (step 302) and forming a second riser by binding a second set of suspension lines together (step 304). Method 300 further comprises forming a first confluence using the first set of suspension lines and the second set of suspension lines. The first confluence may comprise a plurality of first interior confluence suspension lines and a plurality of first exterior confluence suspension lines. The plurality of first interior confluence suspension lines comprises at least one suspension line from the first set suspension lines and at least one suspension line from the second set of suspension lines. The plurality of first exterior confluence suspension line comprises at least one suspension line from the first set of suspension lines and at least one suspension line from the second set of suspension lines.

In various embodiments, method 300 may further include forming a second confluence (step 308). The second confluence may comprise a plurality of second interior confluence suspension lines and a plurality of second exterior confluence suspension lines. The plurality of second interior confluence suspension lines and the plurality of second exterior confluence suspension lines may alternate circumferentially. In various embodiments, method 300 may comprise coupling a canopy to the suspension lines of the first and second confluences (step 310). In various embodiments, the plurality of first interior confluence suspension lines and the plurality of first exterior confluence suspension lines may alternate circumferentially about a perimeter of the canopy. The plurality of second interior confluence suspension lines and the plurality of second exterior confluence suspension lines may also alternate circumferentially about the perimeter of the canopy.

In various embodiments, step 304 may comprise inserting a first suspension line into a second suspension line, and inserting a third suspension line into a fourth suspension line. The second suspension line may be circumferentially adjacent to the first suspension line. The third suspension line may be circumferentially adjacent to the second suspension line. The first suspension line may be circumferentially between the second suspension line and the fourth suspension line.

With combined reference to FIG. 3 and FIGS. 2A and 2B, in accordance with various embodiments, step 302 may comprising forming a first riser (e.g., riser 222) by binding the a first set of suspension lines (e.g., suspension lines $210_5$-$210_8$) together. Step 304 may comprise form a second riser (e.g., riser 220) by binding a second set of suspension lines (e.g., suspension line $210_1$-$210_4$) together. Step 306 may include forming first confluence 230. First confluence 230 may comprise a plurality of first interior confluence suspension lines (e.g., suspension lines $210_1$, $210_3$, $210_5$, $210_7$) and a plurality of first exterior confluence suspension lines (e.g., suspension lines $210_2$, $210_4$, $210_6$, $210_8$).

In various embodiments, step 306 may comprise inserting a first suspension line (e.g., suspension line $210_5$) into a second suspension line (e.g., suspension lines $210_4$), and inserting a third suspension line (e.g., suspension line $210_3$) into a fourth suspension line (e.g., suspension line $210_6$). The second suspension line (e.g., suspension line $210_4$) may be circumferentially adjacent to the first suspension line (e.g., suspension line $210_5$). The third suspension (e.g., suspension line $210_3$) line may be circumferentially adjacent to the second suspension line (e.g., suspension line $210_4$). The first suspension line (e.g., suspension line $210_5$) may be circumferentially between the second suspension line (e.g., suspension line $210_4$) and the fourth suspension line (e.g., suspension line $210_6$).

In various embodiments, step 308 may include forming second confluence 240 in suspension line assembly 204. Second confluence 240 may comprise a plurality of second interior confluence suspension lines (e.g., suspension lines $210_9$, $210_{11}$, $210_{13}$, $210_{15}$) and a plurality of second exterior confluence suspension lines (e.g., suspension lines $210_{10}$, $210_{12}$, $210_{14}$, $210_{16}$).

In various embodiments, step 310 may include coupling canopy 202 to suspension lines 210. In various embodiments, the first interior confluence suspension lines (e.g., suspension lines $210_1$, $210_3$, $210_5$, $210_7$) may alternate circumferentially along a perimeter (i.e., circumference 203) of canopy 202 with the first exterior confluence suspension lines (e.g., suspension lines $210_2$, $210_4$, $210_6$, $210_8$). In various embodiments, the second interior confluence suspension lines (e.g., suspension lines $210_9$, $210_{11}$, $210_{13}$, $210_{15}$) may alternate circumferentially along the perimeter (i.e., circumference 203) of canopy 20 with the second exterior confluence suspension lines (e.g., suspension lines $210_{10}$, $210_{12}$, $210_{14}$, $210_{16}$).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A suspension line assembly for a parachute, comprising:
  a first set of suspension lines bound together, wherein the first set of suspension lines forms a first riser; and
  a second set of suspension lines bound together, wherein the second set of suspension lines forms a second riser;
  wherein a first suspension line of the first set of suspension lines is inserted into a first suspension line of the second set of suspension lines, and wherein a second suspension line of the second set of suspension lines is inserted into a second suspension line of the first set of suspension lines.

2. The suspension line assembly of claim 1, further comprising a canopy coupled to the first set of suspension lines and the second set of suspension lines, wherein the first suspension line of the first set of suspension lines is circumferentially adjacent to the second suspension line of the first set of suspension lines along a circumference of the canopy, and wherein the first suspension line of the second set of suspension lines is circumferentially adjacent to the second suspension line of the second set of suspension lines along the circumference of the canopy.

3. The suspension line assembly of claim 1, further comprising a first confluence formed by the first set of suspension lines and the second set of suspension lines, wherein the first suspension line of the first set of suspension lines and the second suspension line of the second set of suspension lines each forms an interior confluence suspension line of the first confluence, and wherein the first suspension line of the second set of suspension lines and the second suspension line of the first set of suspension lines each forms an exterior confluence suspension line of the first confluence.

4. The suspension line assembly of claim 3, further comprising a canopy coupled to the first set of suspension lines and the second set of suspension lines, wherein the first set of suspension lines alternate about a circumference of the canopy between forming interior confluence suspension lines of the first confluence and forming exterior confluence suspension lines of the first confluence, and wherein the second set of suspension lines alternate about the circumference of the canopy between forming interior confluence suspension lines of the first confluence and forming exterior confluence suspension lines of the first confluence.

5. The suspension line assembly of claim 4, further comprising:
  a third set of suspension lines bound together, wherein the third set of suspension lines forms a third riser; and
  a fourth set of suspension lines bound together, wherein the fourth set of suspension lines forms a fourth riser.

6. The suspension line assembly of claim 5, further comprising a second confluence formed by the third set of suspension lines and the fourth set of suspension lines.

7. The suspension line assembly of claim 6, wherein the third set of suspension lines alternate about the circumference of the canopy between forming interior confluence suspension lines of the second confluence and forming exterior confluence suspension lines of the second confluence, and wherein the fourth set of suspension lines alternate about the circumference of the canopy between forming interior confluence suspension lines of the second confluence and forming exterior confluence suspension lines of the second confluence.

8. The suspension line assembly of claim 6, wherein the third set of suspension lines comprises at least one interior confluence suspension line of the second confluence and at least one exterior confluence suspension line of the second confluence, and wherein the fourth set of suspension lines comprises at least one interior confluence suspension line of the second confluence and at least one exterior confluence suspension line of the second confluence.

9. A parachute, comprising:
  a canopy; and
  a suspension line assembly coupled to the canopy, the suspension line assembly comprising:
    a first set of suspension lines bound together, wherein the first set of suspension lines forms a first riser, and
    a second set of suspension lines bound together, wherein the second set of suspension lines forms a second riser, and wherein a first suspension line of the first set of suspension lines is inserted into a first suspension line of the second set of suspension lines, and wherein a second suspension line of the second set of suspension lines is inserted into a second suspension line of the first set of suspension lines.

10. The parachute of claim 9, wherein the first suspension line of the first set of suspension lines is located adjacent to the second suspension line of the first set of suspension lines and the first suspension line of the second set of suspension lines along a circumference of the canopy.

11. The parachute of claim 9, further comprising a first confluence formed by the first set of suspension lines and the second set of suspension lines, wherein the first suspension line of the first set of suspension lines and the second suspension line of the second set of suspension lines each forms an interior confluence suspension line of the first confluence, and wherein the first suspension line of the second set of suspension lines and the second suspension line of the first set of suspension lines each forms an exterior confluence suspension line of the first confluence.

12. The parachute of claim 11, wherein the first set of suspension lines alternate along a circumference of the canopy between forming interior confluence suspension lines of the first confluence and forming exterior confluence suspension lines of the first confluence, and wherein the second set of suspension lines alternate circumferentially along the circumference of the canopy between forming interior confluence suspension lines of the first confluence and forming exterior confluence suspension lines of the first confluence.

13. The parachute of claim 12, further comprising:
a third set of suspension lines bound together to form a third riser; and
a fourth set of suspension lines bound together to form a fourth riser.

14. The parachute of claim 13, further comprising a second confluence formed by the third set of suspension lines and the fourth set of suspension lines.

15. The parachute of claim 14, wherein the third set of suspension lines alternate along the circumference of the canopy between forming interior confluence suspension lines of the second confluence and forming exterior confluence suspension lines of the second confluence, and wherein the fourth set of suspension lines alternate along the circumference of the canopy circumferentially between forming interior confluence suspension lines of the second confluence and forming exterior confluence suspension lines of the second confluence.

16. The parachute of claim 14, wherein the third set of suspension lines comprises at least one interior confluence suspension line of the second confluence and at least one exterior confluence suspension line of the second confluence, and wherein the fourth set of suspension lines comprises at least one interior confluence suspension line of the second confluence and at least one exterior confluence suspension line of the second confluence.

17. A method of making a parachute, comprising:
forming a first riser by binding a first set of suspension lines together;
forming a second riser by binder a second set of suspension lines together; and
forming a first confluence using the first set of suspension lines and the second set of suspension lines, wherein the first confluence comprises a plurality of first interior confluence suspension lines and a plurality of first exterior confluence suspension lines, and wherein the plurality of first interior confluence suspension lines comprises at least one suspension line from the first set of suspension lines and at least one suspension line from the second set of suspension lines, and wherein the plurality of first exterior confluence suspension lines comprises at least one suspension line from the first set of suspension lines and at least one suspension line from the second set of suspension lines, and
wherein forming the first confluence comprises:
inserting a first suspension line into a second suspension line, the first set of suspension lines including the first suspension line and the second set of suspension lines including the second suspension line; and
inserting a third suspension line into a fourth suspension line, wherein the first set of suspension lines includes the fourth suspension line and the second set of suspension lines includes the third suspension line.

18. The method of claim 17, further comprising coupling a canopy to the first set of suspension lines and the second set of suspension lines, wherein the plurality of first interior confluence suspension lines and the plurality of first exterior confluence suspension lines alternate along a circumference of the canopy.

19. The method of claim 18, further comprising forming a second confluence, the second confluence comprising a plurality of second interior confluence suspension lines and a plurality of second exterior confluence suspension lines, wherein the plurality of second interior confluence suspension lines and the plurality of exterior confluence suspension lines alternate along the circumference of the canopy.

* * * * *